June 20, 1961 T. S. BEVIER 2,988,944
AUTOMATIC TAPE DISPENSER
Filed Sept. 26, 1956 3 Sheets-Sheet 1
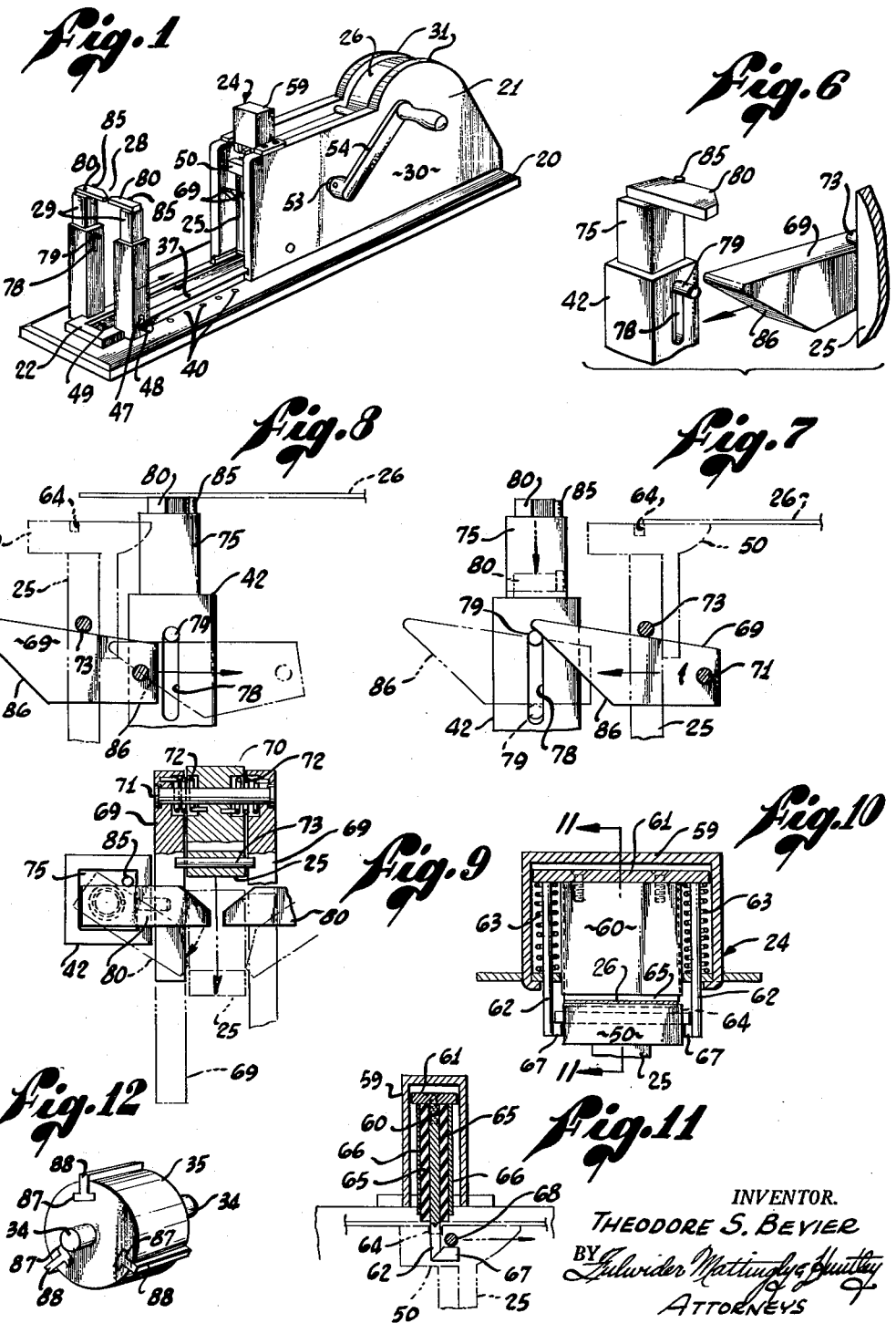
INVENTOR.
THEODORE S. BEVIER
BY Fulwider Mattingly & Huntley
ATTORNEYS

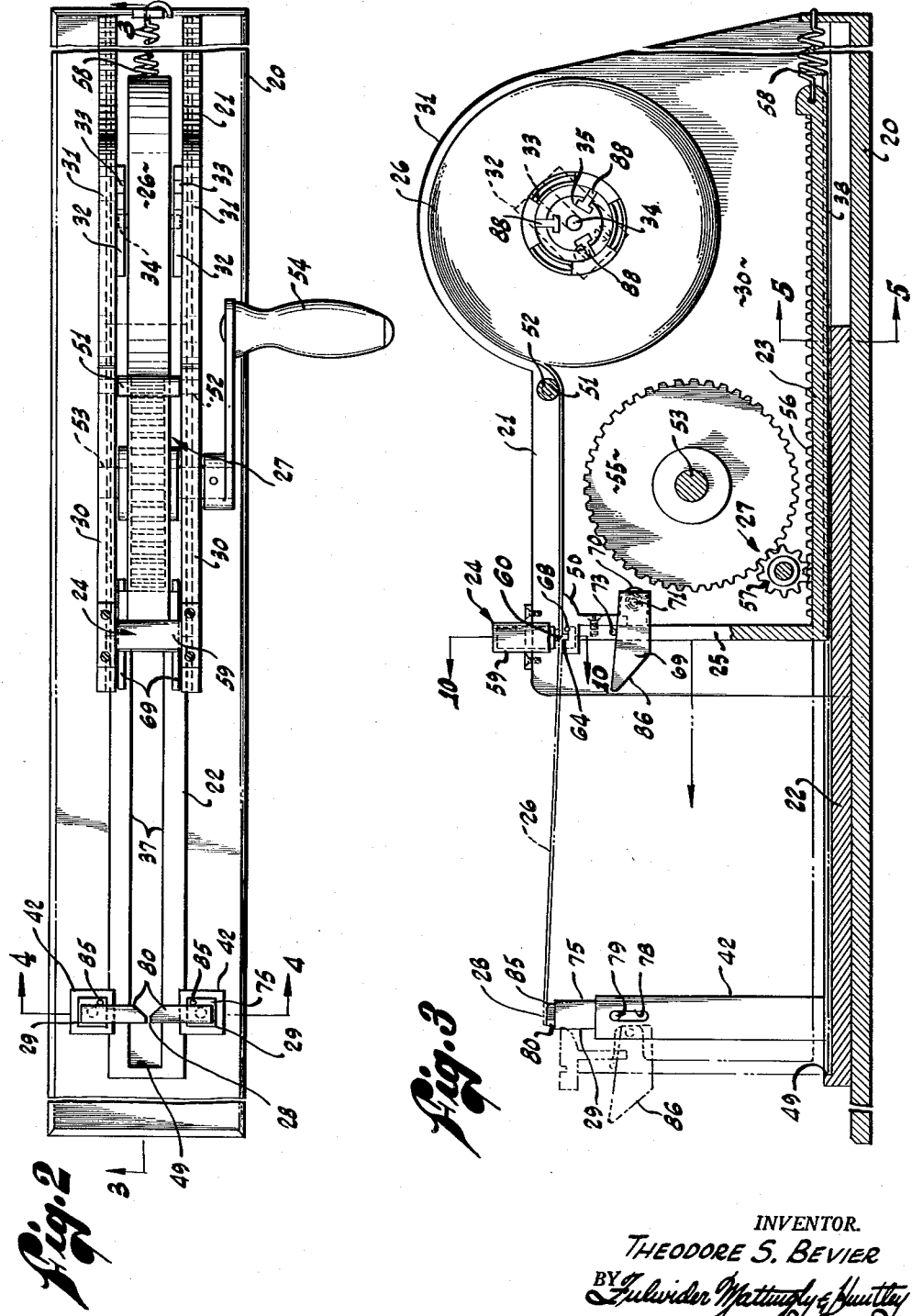

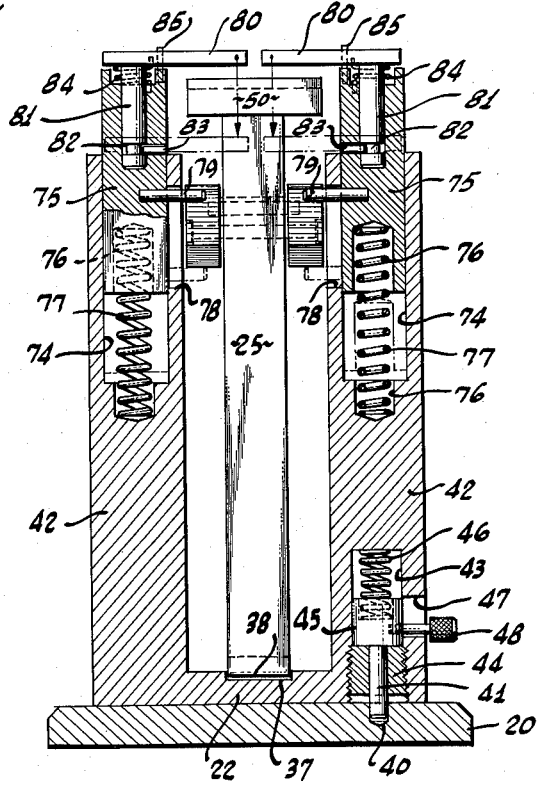

United States Patent Office 2,988,944
Patented June 20, 1961

2,988,944
AUTOMATIC TAPE DISPENSER
Theodore S. Bevier, 137 N. Painter, Whittier, Calif.
Filed Sept. 26, 1956, Ser. No. 612,257
10 Claims. (Cl. 83—233)

The present invention relates in general to pressure sensitive tape dispensers and specifically to a machine that automatically dispenses a severed tape segment of predetermined length.

An object of my invention is to provide improved dispensing apparatus for a wet adhesive or pressure sensitive tape that will automatically sever the tape. By eliminating manual cutting, finger contact with the adhesive of the tape is reduced to a minimum so that damage to its adhesive qualities is avoided. Additionally, the speed of securing a length of tape is substantially increased and at the same time soiling of the fingers is greatly reduced.

Another object of my invention is to provide improved apparatus of this type which includes adjustable means that permit dispensing of varying lengths of tape.

A further object of my invention is to provide a tape dispenser that automatically supports a measured length of tape in a tautly extended position out of contact with the tape measuring and feeding means. The clearance thus achieved permits an unimpeded return stroke of the feeding means for actuating the tape cutter to leave a severed tape segment of desired length conveniently supported for removal from the machine.

Yet another object of the invention is to provide an improved tape dispensing apparatus that in response to a single manipulation of its actuating lever will automatically dispense a severed length of pressure sensitive tape of a desired length.

The invention also has for an object thereof the provision of a tape dispenser of simple and sturdy design that can be manufactured at a very low cost to provide long and durable service.

These and other objects and advantages of my invention will appear from the following description of a presently preferred embodiment thereof and from the annexed drawings illustrating that embodiment in which:

FIGURE 1 is a perspective view of a tape dispensing machine constructed in accordance with my invention;

FIGURE 2 is a top plan view of the machine shown in FIGURE 1;

FIGURE 3 is a vertical longitudinal sectional view taken along the line 3—3 of FIGURE 2;

FIGURE 4 is a transverse vertical sectional view taken along the line 4—4 of FIGURE 2 and showing the automatic means for supporting a measured length of tape in tautly extended position;

FIGURE 5 is a partial transverse sectional view taken in the direction of line 5—5 of FIGURE 3;

FIGURE 6 is a partial perspective view on enlarged scale;

FIGURES 7 and 8 are partial side elevations showing the operation of the transfer gate of the machine whereby the extended tape is taken up by the gate to be supported out of contact with the tape feeding means;

FIGURE 9 is a fragmentary top plan view partially in section of the transfer means shown in FIGURES 7 and 8;

FIGURE 10 is a partial transverse sectional view of the tape cutter;

FIGURE 11 is a vertical sectional view taken on the line 11—11 of FIGURE 10;

FIGURE 12 is a perspective showing the tape roll supporting spool of the machine with adapters mounted therein;

FIGURE 13 is an end view of the adapters shown in FIGURE 12; and

FIGURE 14 is a partial transverse sectional view of tape roll supporting means with another form of adapter therein.

Referring now to the drawings and in particular to FIGURES 1, 2 and 3, there will be seen a base 20 which mounts a housing 21 on one of its end portions. On the top of the base 20 is a longitudinally adjustable gauge element 22. Slidably mounted between walls of the housing 21 and on top of gauge 22 is a spring biased feeding rack 23. Rigidly mounted on top of the housing 21 is cutter means 24 that is in vertical alignment with an upstanding element 25 carried by the feed rack 23 when the rack is in the retracted position shown in FIGURE 3. A roll of pressure sensitive adhesive tape 26 is freely rotatably mounted in the housing 21 with its free end adherently engaged by the upper end of the element 25.

The housing 21 also supports manually actuated gear drive means 27 for moving the spring biased feed rack 23 outwardly of the housing to the limit permitted by the gauge 22, as is shown in phantom line in FIGURE 3. A transfer gate, designated generally by the numeral 28, is rigidly mounted on the gauge 22 at the end thereof opposite to the housing 21. The transfer gate 28 has cam operated means 29 that lift the free end of the tape 26 from the upper end of the element 25. The tape 26 is thus removed out of the way of the feed rack 23 which returns to its retracted position of FIGURE 3. The cutter means 24 are actuated by the return of the feed rack 23 to this retracted position to sever tape 26. The severed portion of the tape 26 can then be removed for use as desired.

Specifically the base 20 is of elongated rectangular shape and preferably is made of a rigid material such as metal or plastic. As is best seen in FIGURE 1, the housing 21 is defined by two parallel side walls 30 rigidly mounted on the upper surface of the base 20 and extend longitudinally thereof at one end portion of the base. The walls 30 include upwardly projecting semicircular portions 31 between which the roll of tape 26 is mounted in the manner best seen in FIGURES 2 and 3. It will be observed that the space between the housing's walls 30 is approximately twice the width of the tape 26. At the geometric center of the semi-circular portions 31 on the interior face of each wall 30 there is rigidly mounted a U-shaped member 32 such as is indicated in dotted outline in FIGURE 3. The members 32 are so positioned that the slots 33 thereof are in alignment to open rearwardly and upwardly of the machine. The slots 33 are adapted to slidably receive the shaft 34 of adapter spool 35. When the tape of a roll is spent the skeleton hub can be removed and fresh rolls inserted in the machine merely by lifting or dropping the rolls of tape into the U-shaped member 32.

The gauge 22 is an elongate rectangular solid member that is slidably mounted on top of the base 20 and between the housing walls 30 in the manner best seen in FIGURE 5. It will be observed that the confronting faces of the housing's walls 30 at their junctions with the base 20 are formed with longitudinally extending slots 36. The slots 36 slidably receive the gauge 22 which in turn cooperates with the housing 21 to longitudinally slidably support the feed rack 23. The upper face of the gauge 22 is grooved as at 37 to receive a rib 38 that protrudes downwardly from the lower face of the feed rack 23. The slots 36 of housing walls 30 are enlarged as at 39 in order to slidably receive the opposite edges of the feed rack 23 and thus form confining tracks for the rack 23.

To adjust the gauge 22 for limiting the stroke of the feed rack 23 thereon, the gauge 22 is provided with means to removably affix it to the base 20. In FIGURE 1 it will be seen that the base 20 is formed with a plurality of holes 40 opening into its upper face positioned along an edge of the gauge 22. The holes 40 are adapted for registration with the spring loaded pin 41 carried by one of the two vertically extending colums 42 that are rigidly affixed to the outer end of the gauge 22. This construction can best be seen in FIGURE 4 wherein a downwardly opening bore 43 is formed in one of the columns 42. The lower end of the bore 43 is threaded to receive a pin guide 44 through which the pin 41 is vertically slidable. Pin 41 includes a cylindrical body portion 45 that is slidable in the bore 43 and a compression spring 46 that is enclosed in the bore 43 normally biasing the pin 41 into engagement with one of the holes 40. The column 42 has a vertically elongate hole 47 through a side thereof. A stud 48 rigidly mounted on pin body 45 protrudes outwardly through the elongate hole 47.

As is shown in FIGURES 1, 2 and 3, the groove 37 that is formed in the upper face of the gauge 22 terminates short of the outer end of the gauge as at 49. The groove end 49 defines the limit of the outward stroke of the feed rack 23. Accordingly, the adjustment of the length of tape 26 to be cut by the machine is effected by selecting one of the body holes 40 for engagement by the pin 41.

Referring now to FIGURE 3, it will be seen that the vertical element 25 has a feed head 50 rigidly mounted on the upper end thereof. It will be noted that the upper surface of the head 50 lies in substantially the same horizontal plane as a guide roller 51 which is rotatably mounted on a shaft 52 which extends transversely between the housing walls 30 at a point adjacent to the roll of tape 26. The guide roller 51 is adapted to receive the outer or dry face of the tape 26 as it is unwound from the spool 35. The adhesive coated side of the free end of tape 26 is fastened to the top surface of the head 50.

Transversely mounted in the housing 21 is a rotatable shaft 53 that rigidly mounts a turning handle 54 and a drive gear 55. The drive gear 55 is drivingly connected to rack teeth 56 formed on the upper face of the feed rack 23 by a pinion 57. Movement of the handle 53 in a counter-clockwise direction, as viewed in FIGURE 3, will cause extension of the feed rack 23, the outward stroke of the rack 23 continuing until its outer end comes into contact with the end 49 of the gauge 22. Inasmuch as the free end of tape 26 is adherently engaged by the head 50 of the element 25 such actuation of the handle 54 will cause simultaneous extension of the tape 26 to a predetermined amount. After the extended portion of the tape has been lifted from the head 50 by the transfer gate 28 (presently to be described), release of the handle 54 will permit retraction of the feed rack 23 by a tension spring 58 that interconnects the inner end of said rack with the rear end of the base 20.

When the feed rack 23 is in retracted position, the head 50 thereof is positioned directly beneath the cutter means 24. Cutter means 24 can best be seen in FIGURES 3, 10 and 11 and said means include a cover 59 rigidly affixed to the upper edges of housing walls 30 to extend transversely therebetween. As can be seen in FIGURE 10, the cover 59 almost entirely encloses means 24 but is formed with suitable apertures in its bottom panel through which a cutter blade 60 and pair of rods 62 protrude. It will be observed that both the rods and the blade 60 are rigidly mounted to a header 61 that is vertically slidably disposed inside the cover. Compression springs 63, coiled around each of the rods, at all times urge the blade 60 into raised position wherein it is out of contact with the upper surface of the tape 26. It will be seen that FIGURES 10 and 11 show the cutter blade 60 in lowered position wherein it penetrates the tape 26. The feed head 50 provides an element of a cutter in that it is formed with a transversely extending clearance slot 64 that is of sufficient depth to admit the cutting edge of the blade 60 therein to provide for shearing the tape without permitting any contact of said edge with the bottom of the slot 64.

The lower ends of the rod 62 are formed with inwardy turned cams 67 between which the feed head 50 is slidable. The cams 67 are adapted to be engaged by opposite ends of a transverse member 68 which is rigidly affixed in the head 50 to extend outwardly on the opposite sides thereof. When the head 50 is moved outwardly of the housing 21 towards extended position the cams 67 are released by the member 68 thus permitting the blade 60 to be raised from the position shown in FIGURES 10 and 11. When the blade 60 is raised the cams 67 and member 68 are in substantially the same horizontal plane. Thus, when the head 50 is returned to retracted position, as indicated by the arrow in FIGURE 11, the member 68 strikes the forwardly facing cam surfaces of the cams 67, thus forcing the blade 60 downwardly into cutting engagement with the tape 26.

In order to insure a secure connection between the upper face of the head 50 and the adhesive coated lower side of the tape 26, the cutter means 24 also includes means to impose a positive pressure on the upper surface of the tape whereby the adherence of the tape to the head 50 is insured. This adherence of the tape 26 to the head 50 is particularly important during the extension of the feed rack 23 when there is an appreciable tension exerted between the free end of the tape and its point of departure from the roll thereof supported in the housing 21. In order to insure the security of this temporary connection of the tape and head, I have provided a pair or resilient pads 65 overlying both sides of the blade 60 such as are shown in FIGURE 11. The pads 65 have rigid backing elements 66 thereon to substantially confine expansion and contraction of the pads to a vertical direction. The pads 65 are of slightly lesser height than the blade 60 so that the cutting edge of the blade extends therebelow. When the feed head 50 is in retracted position with the blade 60 lowered to penetrate the tape 26, the pads 65 will simultaneously engage the upper or dry side of the tape 26 and be compressed in a vertical direction. Thus an appreciable amount of force is impressed on the tape 26 to effect a secure connection between the head 50 and the adhesive coated side of tape 26.

When the feed rack 23 is extended, the tape 26 will be carried outwardly towards the transfer gate 28 in a plane substantially parallel to that of base 20. During this extension of the tape 26, the blade 60 will be raised out of contact with the upper surface of the tape thereby avoiding any damage thereto. When the feed rack 23 is extended to the limit permitted by the gauge end 49, the transfer gate 28 will be actuated to lift the extended tape portion to the position shown in phantom line in FIGURE 3. With the tape 26 thus elevated, the portion thereof beneath the blade 60 is raised into contact therewith to permit unimpeded return of the head 50 to retracted position. When the head 50 reaches retracted position, there will be a slight clearance space between its upper surface and the lower adhesive coated side of the tape 26. This return of the head 50 to retracted position will simultaneously cause the lowering of blade 60 and the pads 65 whereby the tape 26 is severed and the newly cut free end thereof firmly pressed against the upper face of the head.

In order to accomplish the just mentioned elevating of the extended portion of tape 26, the feed rack element 25 carries actuators 69 for the control of the transfer gate 28. As is shown in FIGURE 3, the inner face of element 25 has a bracket 70 rigidly affixed thereto which rotatably supports a transversely disposed shaft 71. The two actuators 69 are mounted on opposite ends of the shaft 71. By torsion springs 72 on both ends of shaft 71, the actuators 69 are constantly biased for movement in a clockwise direction as viewed in FIGURES 3 and 7. Stops 73 protrude outwardly from opposite sides of the element 25 to normally retain the actuators 69 in the manner shown in FIGURE 3.

The transfer gate 28 is adapted to respond to movement therethrough of the actuators 69. The means by which this is accomplished can best be seen in FIGURE 4. Each of the gate columns 42 is formed with an upwardly opening axially extending hole 74 that slidably receives a vertical member 75. The blind end of the hole 74 and the inner end of the member 75 are counterbored as at 76 in order to seat a compression spring 77 therein. The confronting inner faces of the columns 42 are formed with vertically elongate openings 78 that slidably receive pins 79 which are carried by the members 75. It will be observed that the pins 79 extend inwardly towards one another into the passage between the columns 42 and thus are disposed in the path of travel of the actuators 69.

Each of the vertically slidable members 75 at its upper end pivotally mounts a horizontally disposed lift element 80. The elements 80 are affixed to vertically disposed shafts 81 which are rotatably seated in the members 75. The lower end of the shafts 81 are annularly grooved as at 82 to slidably receive the inner ends of pins 83 that extend inwardly through the wall of members 75. Also interconnecting the lift elements 80 and the members 75 are torsion springs 84. As is shown in FIGURE 9, the lift elements 80 are thus normally biased to yieldably resist extending movement of the feed head 50 therethrough, since they are normally biased toward a transversely disposed position across the passage between the columns 42 which position is determined by appropriately located stop elements 85.

The cycle of events which takes place to transfer the tape 26 from the feed head 50 to the lift elements 80 can best be understood by reference to FIGURES 6, 7 and 8. It is first to be noted that the lift elements 80 under the urging of the springs 77 are normally disposed at a higher elevation than the upper surface of the feed head 50. The actuators 69 are carried by the elements 25 with portions thereof in advance of the head 50 whereby the lift elements 80 are first lowered to permit the extended tape 26 to pass thereover. After the actuators 69 have passed outwardly between the gate columns 42 and forwardly of the pins 79, the lift elements 80 are released to spring upwardly into engagement with the adhesive coated side of the tape 26 to lift the extended tape above the level of the feed head 50.

It will be observed that the forward face 86 of actuators 69 slopes rearwardly and downwardly from its upper forward corner. The lower and rear edges of actuators 69 are substantially horizontally and vertically disposed, respectively, while the upper edges of each of the actuators extend forwardly and slightly upwardly. In FIGURES 6 and 7, the actuator 69 is depicted as moving outwardly in the direction of the arrows. As the actuator 69 contacts the pin 79 which protrudes into the passage between gate columns 42, the lift element 80 is depressed by virtue of the slanted forward face 86 of the actuator. As an examination of FIGURE 7 will show, by the time the lift elements 80 have been depressed to the lowermost position the feed head 50 and element 25 will have entered into the passage between the columns 42. It will be recalled that the lift elements 80 are biased by torsion springs 84 rather than being rigidly mounted in place and therefore the elements will pivot to the position shown in phantom lines in FIGURE 9, thus yielding to the passage of head 50 therebetween. After feed head 50 has passed lift elements 80, these elements will return to the position shown in solid line in FIGURE 9. The actuators 69 are caused to continue to advance from the position shown in phantom lines in FIGURE 7 to the position shown in solid line in FIGURE 8 at which point the pins 79 will be released and the lift elements 80 will move upwardly under the urging of the springs 77. As the lift elements 80 move upwardly, they engage the adhesive coated underside of tape 26, which adheres thereto, and the tape 26 is positively lifted away from the upper face of the feed head 50. It will be apparent that retracting movement of the feed rack 23 cannot take place until this elevation of the extended tape 26 has occurred. When the lift elements 80 have reached their fully elevated position, the pins 79 will clear the rear edge of actuator 69 thus permitting the feed rack 23 to be retracted by spring 58. As the actuators 69 retract past pins 79, they will be moved in a counter-clockwise direction into the position shown in phantom line in FIGURE 8.

Rolls of tape 26 are available in standard widths but there does not appear to be any standardization of the hub sizes on which such tape is wound. Accordingly, it becomes desirable to provide a spool which can be adapted to accommodate any of the variety of hub sizes which might be found on tape rolls. Such a spool, designated by the numeral 35, is shown in FIGURE 12.

The spool 35 is formed with a plurality of equally circularly spaced and longitudinally extending T-shaped slots 87. These slots 87 are adapted to axially slidably receive complementary T-shaped elongate adapters 88, such as are shown in FIGURE 13. These adapters may be a rigid material but I prefer that they be formed of a resiliently deformable material as shown in FIGURE 14. The diameter of the spool 35 is itself preferably made so as to accommodate in a tight sliding fit the internal diameter of a hub or one of the commercially available spools of tape 26. As is suggested by FIGURE 13, the adapters 88 may be provided in different sizes in order to accommodate larger hub diameters.

In FIGURE 14 there is shown a roll of tape 26 having a hub 89 of greater diameter than that of spool 35. After the resilient adapters 88 have been inserted in the slots 87 of spool 35, the spool may then be inserted into the hub. If the internal diameter of the hub 89 is substantially less than the diameter defined by the outer edges of adapters 88 the spool 35 can be twisted during insertion so that adapters 88 will assume the configuration shown in FIGURE 14. When thus mounted on the spool 35 the roll of tape 26 can be inserted into the slots of the U-shaped members 33 in housing 21 in the manner previously described.

The operation of the invention is extremely simple and is apparent from the foregoing description. After the roll of tape 26 has been mounted in housing 21, the free end thereof is loosened and wound under the guide roller 51. It will be found convenient to unwind from the roll a length of tape 26 which is slightly longer than the distance between the guide roller 51 and the cutter means 24. The handle 54 of the machine can then be grasped and moved towards the user to slightly extend the feed head 50 outwardly beyond the cutter means 24. With the feed head 50 held in this position, the free end of the tape 26 can then be passed under cutter means. After that is done, the handle 54 may be released and the head 50 will then return to its retracted position underneath the cutter means 24. This will result in actuation of the blade 60 to sever a small piece of the tape 26 and the machine is then ready for use to cut length of tape to any desired length.

Then the head 50 is in retracted position, the blade 60 and pads 65 bearing down thereon will aid in maintaining the feed rack 23 in retracted position. It will be evident that other stop means could be incorporated in the housing 21 to limit the retracting movement of the feed rack 23.

The gauge 22 is then adjusted for the desired length of tape 26 by lifting upwardly on the stud 48 to release the pin 41 for movement to a selected hole 40 of base 20. After this adjustment has taken place the machine is ready to dispense successive sections of tape of the selected length. In order to secure a piece of tape from the dispenser, the handle 54 is pulled towards the user, i.e. towards the transfer gate 28 until the outer end of the feed rack 23 comes into contact with the gauge end 49. When rack 23 has thus been fully extended, the extended section of tape 26 will have been lifted from the feed head 50 and elevated slightly to permit retracting movement of the feed rack 23. The handle may then be released to be pulled back into retracted position by the spring 58. Upon reaching retracted position the member 68 that is carried by the head will engage the camming element 67 to force lowering of the blade 60. The extended section of tape 26 will be severed thereby and the newly cut free end of tape 26 will be held securely in engagement with the upper face of the head 50. The severed segment of tape may then be lifted from the lift elements 80 and the portion of the head 50 forwardly of its slot 64.

As is apparent, the dispenser can also be used to cut a piece of tape 26 of any desired length. It will be recalled that initial movement of handle 54 immediately lifts blade 60 from feed head 50 thus providing a clearance space between which tape 26 can be manually pulled to any desired length. To hold the blade 60 in raised position while a length of tape is being pulled out, the dispenser can have a pin loosely connected to its base 20 or housing 21 that can be inserted in a hole formed in a housing wall 30 adjacent to handle 54, thus serving as a stop to prevent full retraction of handle 54. After the desired length of tape 26 has been drawn out, this stop pin would be removed to allow retraction of handle 54 whereby the tape 26 would be cut.

While there has been shown herein what is considered to be the preferred embodiment of the present invention, it will be apparent that various modifications and changes may be made with respect to the foregoing description without departing from the spirit of the invention or the scope of the following claims.

I claim:

1. A dispenser for a roll of pressure sensitive adhesive tape, comprising: a base adapted to rotatably support a roll of tape at one end thereof; a feed element adherent to the free end of said tape that is movable outwardly from a retracted position thereof to cause extension of a length of said tape; means to extend said feed element to a predetermined length; a transfer gate that includes a lift element normally positioned above the plane of said retracted element and that is resiliently depressible to a plane beneath said tape in extended position; a member rigidly interconnected with said lift element that is normally positioned in the path of extension of said feed element; an actuator carried by said feed element that is adapted to translate extension thereof into reciprocal vertical movement to said lift element whereby said lift element is first depressed to a plane beneath said extended tape and thereafter permitted to lift the free end of said tape from said feed element; a cutter on said dispenser on the opposite side of said tape from said feed element, said cutter being normally held out of contact with said tape; and cam means that interconnect said cutter and said feed element when said element is retracted to a position opposite said cutter, said cam means being adapted to translate retracting movement of said element into cutting movement of said cutter, said feed element providing a bed for said cutter to which the newly cut free end of said tape adheres in response to said cutting movement.

2. A dispenser for a roll of pressure sensitive adhesive tape, comprising: an elongate base that rotatably supports a roll of tape at one end thereof; a feed rack reciprocally slidably mounted on said base; a feed head carried by said rack that adheres to the adhesive coated side of the free end of said tape; spring means normally holding said feed rack in a retracted position; a cutter on said dispenser on the opposite side of said tape from said retracted feed head; spring means normally holding said cutter in raised position out of contact with said tape; cam means that interconnect said cutter and feed head when said feed head is retracted to lower said cutter into cutting engagement with said tape; and means to move said feed rack from its retracted position to disconnect said cam means and unroll a length of said tape past said cutter so that upon retraction of said rack said cutter is actuated by said cam means to sever an extended length of said tape.

3. A device as defined in claim 2 in which said feed rack is slidably mounted on an adjustable gauge to limit extension of said tape.

4. A device as set forth in claim 2 in which said cutter comprises a blade that has a pad of a resilient material on both sides thereof beneath which the cutting edge of said blade protrudes, said pads being compressibly engageable with the dry side of said tape when said blade is lowered into severing engagement with said tape.

5. A device as set forth in claim 2 in which said base supports a transfer gate at the end thereof opposite to said roll of tape, said gate comprising: a pair of vertical columns between which said feed head passes during extension and retraction thereof; a vertically slidable member at the upper end of each of said columns; a pair of horizontally disposed lift elements each of which is pivotally mounted on one of said slidable members to normally extend across the passage between said gate; spring means biasing said lift elements towards said normally extended position thereof that are yieldable to the passage of said feed head outwardly through said lift elements; spring means normally holding said lift elements above the plane of said feed head; and cam means interconnecting said feed head and said vertically slidable member to lower said lift elements below the plane of said feed head while said feed head is passing outwardly through said gate, said cam means permitting elevation of said lift elements to a plane above said feed head after said feed head has passed through said lift elements whereby the free end of said tape is removed from said head and adheres to said lift elements.

6. A dispenser for a roll of pressure sensitive adhesive tape, comprising: an elongate substantially rectangular base; a housing rigidly affixed to one end portion of said base that consists of a pair of longitudinally extending parallel walls; a gauge slidably mounted on the upper surface of said base that is movable inwardly and outwardly of said housing; adjustment means interconnecting said gauge and base for selectively locking said gauge in predetermined position outwardly of said housing; a feed rack slidably carried on said gauge between the walls of said housing for reciprocating movement inwardly and outwardly of said housing, said feed rack including a vertically extending element; spring means interconnecting said feed rack and said base that normally biases said feed rack into a retracted position within said housing; means to rotatably support a roll of tape in said housing; a feed head rigidly affixed to the upper end of said feed rack element that is adhesively engageable with the adhesive coated side of the free end of said roll of tape; a guide roller extending between said housing walls adjacent said roll of tape that is adapted to bear against the dry side of said tape in substantially the same horizontal plane with the upper surface of said feed head; a vertically movable cutter blade supported between said housing walls in alignment with said feed rack element when said feed rack is in said retracted position said blade being adapted for registration with a transverse clearance slot formed in the upper face of said feed head; spring means normally biasing said blade into raised position out of contact with a tape on said feed head; cam means interconnecting said blade and feed head that are engaged when said feed head is in retracted position to lower said blade into cutting engagement with a tape carried by said feed head, said cam means being disengaged when said rack is extended outwardly from said housing; means to extend said feed rack outwardly from said housing to the extent permitted by said gauge means; a pair of vertically extending columns rigidly carried on opposite sides of said gauge at the outer end thereof, said columns being adapted to permit passage of said feed rack therebetween; a vertically slidable member at the upper end of each of said columns; a pair of horizontally disposed lift elements each of which is pivotally mounted in the upper end of one of said slidable members, said lift elements being normally positioned across the passage between said columns; torsion spring means biasing said lift elements towards said normal positions thereof; spring means normally holding said lift elements above the plane of said feed head; and cam means interconnecting said feed head and said vertically slidable members to lower said lift elements below the plane of said feed head while said feed head is passing outwardly between said columns, said cam means permitting elevation of said lift elements to a plane above said feed head after said head has passed through said lift elements whereby the free end of said tape is removed from said head and adheres to said lift elements.

7. In a dispenser for a roll of pressure sensitive tape that has an extendible feed element engaging the adhesive coated side of the free end of said tape for unrolling a length thereof, transfer means to remove the free end of said tape from said element, comprising: at least one lift element resiliently mounted on said dispenser above the plane of movement of said feed element that is depressible beneath said plane; and co-acting cam means carried by said lift element and feed element that are adapted for engagement when said feed element is extended to translate movement of said feed element into reciprocal vertical movement of said lift element whereby said lift element is first depressed to permit extension of said tape thereover and thereafter permitted to rise to lift the free end of said tape from said feed element.

8. A device as set forth in claim 7 in which said lift element is also pivotally mounted and is resiliently yieldable to the extension therethrough of said feed element.

9. A dispenser for a roll of pressure sensitive tape having an adhesive side and a dry side, said dispenser comprising an extendible feed element engaging the adhesive coated side of the free end of said tape for unrolling a length thereof, transfer means for removing the free end of said tape from said element, comprising: At least one lift element mounted on the dispenser and normally disposed on one side of path of movement of the feed element and on the dry side of the tape; and mechanism including cooperating elements carried by the lift and feed elements for translating extension movement of the feed element to first move the lift element from said one side of the path of movement to the opposite side of path of movement of the element and thereafter move the lift element into adhesive engaging relationship with the adhesive side of the tape while the feed element is being extended by said mechanism; a track for the feed element defining said path; and means for causing extension movement to be imparted to the feed element along said track.

10. A dispenser for a roll of pressure sensitive adhesive tape having an adhesive side and a dry side, said dispenser, comprising: A base for rotatably supporting a roll of tape; a feed element adherent to the adhesive side of the free end of said tape; a track for said element, said element being movable along said track from a retracted position thereof to cause extension of a length of the tape; means for moving said feed element along the track; a transfer mechanism including a lift element normally positioned on one side of the path of movement of said retracted feed element and on the dry side of said tape and resiliently movable to the opposite side of the path of movement of said tape and into adhesive engagement with the adhesive side of the tape; means normally urging said lift element toward its first mentioned position; cooperating means on the lift element and said feed element for translating extension movement of the feed element and during said extension movement to first move the lifting element from the first mentioned position to the second mentioned position and thereafter render said urging means operative for causing the lift element to lift the free end of the tape from the feed element.

References Cited in the file of this patent

UNITED STATES PATENTS

| Re. 22,972 | Fritzinger | Feb. 10, 1948 |
| 1,118,232 | Rebbein | Nov. 24, 1914 |
| 1,849,760 | Herman | Mar. 15, 1932 |
| 2,260,489 | Sim | Oct. 28, 1941 |
| 2,298,360 | Fitch | Oct. 13, 1942 |
| 2,381,301 | Markle | Aug. 7, 1945 |
| 2,416,785 | Welch | Mar. 4, 1947 |
| 2,421,319 | Ehret | May 27, 1947 |
| 2,507,446 | Krueger | May 9, 1950 |
| 2,573,911 | Krueger | Nov. 6, 1951 |
| 2,623,588 | Fritzinger | Dec. 30, 1952 |
| 2,707,024 | Neubronner | Apr. 26, 1955 |
| 2,746,543 | Gezich | May 22, 1956 |

FOREIGN PATENTS

| 659,758 | Germany | May 10, 1938 |
| 1,096,361 | France | Jan. 26, 1955 |